(12) United States Patent
Huang

(10) Patent No.: US 6,626,360 B2
(45) Date of Patent: Sep. 30, 2003

(54) CARRIER MECHANISM FOR SUPPORTING AND MOVING TRAVELING MODULE

(75) Inventor: Chih-Wen Huang, Hsinchu (TW)

(73) Assignee: Umax Data Systems, Inc., Hsinchu (TW)

( * ) Notice: Subject to any disclaimer, the term of this patent is extended or adjusted under 35 U.S.C. 154(b) by 291 days.

(21) Appl. No.: 09/793,619

(22) Filed: Feb. 27, 2001

(65) Prior Publication Data

US 2002/0117546 A1 Aug. 29, 2002

(51) Int. Cl.[7] ................................................ G06K 7/10
(52) U.S. Cl. ........................ 235/454; 235/483; 235/479
(58) Field of Search ............................... 235/454, 439, 235/479, 483, 484; 399/211; 358/296, 401

(56) References Cited

U.S. PATENT DOCUMENTS 5,734,483 A * 3/1998 Itoh ........................... 358/496
6,335,802 B1 * 1/2002 Hung-Che et al. ......... 358/296

* cited by examiner

Primary Examiner—Karl D. Frech
Assistant Examiner—Jamara A. Franklin
(74) Attorney, Agent, or Firm—Rosenberg, Klein & Lee

(57) ABSTRACT

A carrier mechanism for supporting and moving a travelling module along a predetermined travelling path is disclosed. The carrier mechanism includes a guide device fixed inside a casing, a carrier movable along the guide device between a forward and rearward positions with the travelling module removably mounted on the carrier and a driving mechanism including a motor mounted to the carrier and in driving engagement with the guide device for moving the carrier between the forward and rearward positions. The guide device includes an elongate strip integrally formed on a bottom of the casing with a rack formed along a side face thereof to drivingly engage a pinion of the motor. Alternatively, a timing belt and toothed wheel system or a wire and pulley system or a worm and gear system may be used to replace the pinion and rack system.

8 Claims, 11 Drawing Sheets

CARRIER MECHANISM FOR SUPPORTING AND MOVING TRAVELING MODULE

BACKGROUND OF THE INVENTION

1. Field of the Invention

The present invention generally relates to a carrier mechanism, and in particular to a carrier mechanism for supporting and moving a travelling module of an optic scanner.

2. Description of the Prior Art

An image scanning device or optic scanner generally comprises an optic scanning module movable by a driving module between a forward position and a rearward position for scanning a document to be scanned. FIG. 1 of the attached drawings shows an example of a conventional flat-bed optic scanner, mainly comprising a casing 11, a document support plate 12, an optic scanning module 13, a pair of guide rods 14a, 14b, and a driving mechanism.

The guide rods 14a, 14b are parallel to and spaced from each other. The driving mechanism includes a driving motor 15 and a transmission belt or a gear train 16 mechanically coupled to the optic scanning module 13 for driving the scanning module 13 between the forward and rearward positions.

The driving mechanism of the conventional optic scanner requires a complicated structure including a number of parts. This increases costs of manufacture and maintenance. Furthermore, the prior art suffer a problem that the driving mechanism is integrated with the scanning module. This causes difficulty in making modification of the scanning module for the driving mechanism that is integrated with the scanning module has to be redesigned in order to be compatible with the modified scanning module.

It is thus desirable to provide a carrier mechanism for an optic scanner to overcome the above problems.

SUMMARY OF THE INVENTION

Accordingly, an object of the present invention is to provide a carrier mechanism for supporting and moving a travelling module. By means of the carrier mechanism, the travelling module may be supported and moved between a forward position and a rearward position along a predetermined travelling path.

The other object of the present invention is to provide a carrier mechanism to which an image scanning module is removably mounted whereby the image scanning module may be replaced by another scanning module of different specification without modifying the carrier mechanism.

Another object of the present invention is to provide a supporting and driving mechanism for an image scanning module of an optic scanner having a simplified structure and thus required fewer parts and reduced cost.

To achieve the above objects, in accordance with the present invention, there is provided a carrier mechanism for a travelling module. The travelling module is supported by the carrier mechanism and movable along a predetermined travelling path. In a preferred embodiment of the present invention, the travelling module is an image scanning module of an optic scanner. The carrier mechanism is mounted inside a casing of the optic scanner for supporting and moving the image scanning module in a predetermined direction between forward and rearward positions. The carrier mechanism comprises a guide device fixed inside the casing, a carrier movable along the guide device between the forward and rearward positions with the scanning module removably mounted on the carrier and a driving mechanism comprising a motor mounted to the carrier and in driving engagement with the guide device for moving the carrier between the forward and rearward positions. The guide device comprises an elongate strip integrally formed on a bottom of the casing with a rack formed along a side face thereof to drivingly engage a pinion of the motor. Alternatively, a timing belt and toothed wheel system or a wire and pulley system or a worm and gear system may be used to replace the pinion and rack system.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
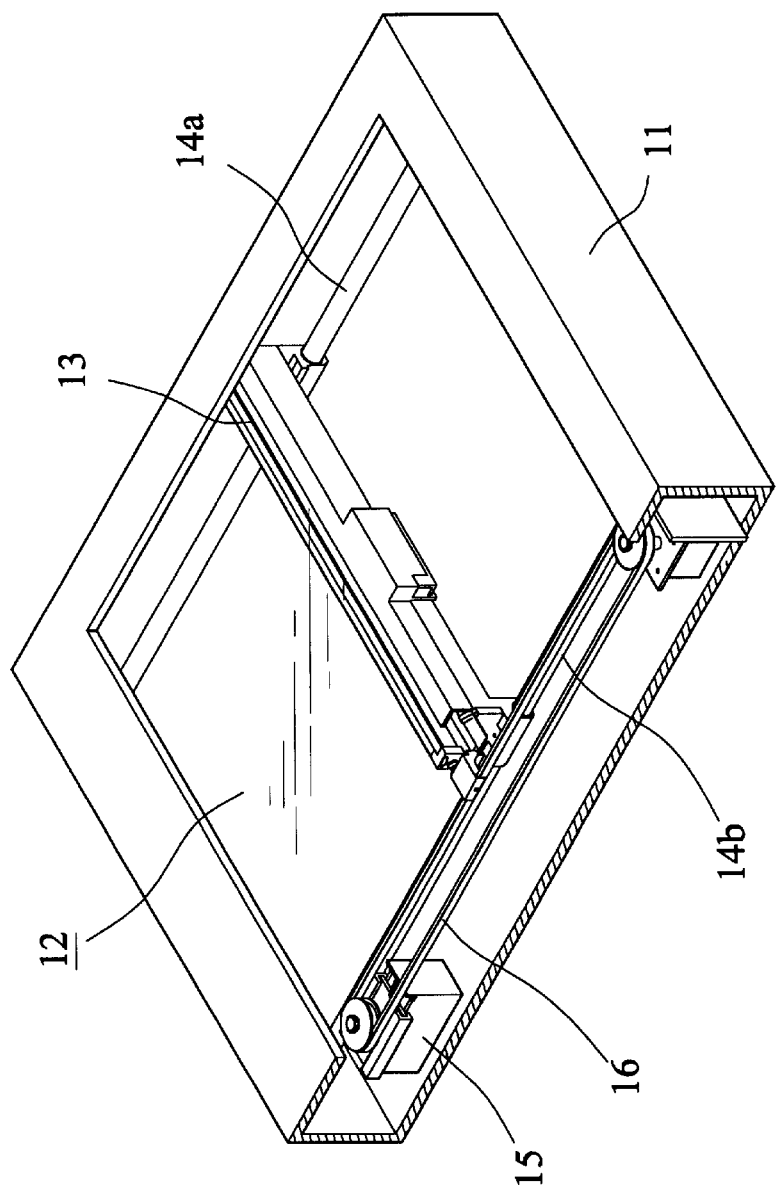
FIG. 1 is a perspective view, partially broken, of a conventional flatbed type optic scanner.
Figure 2:
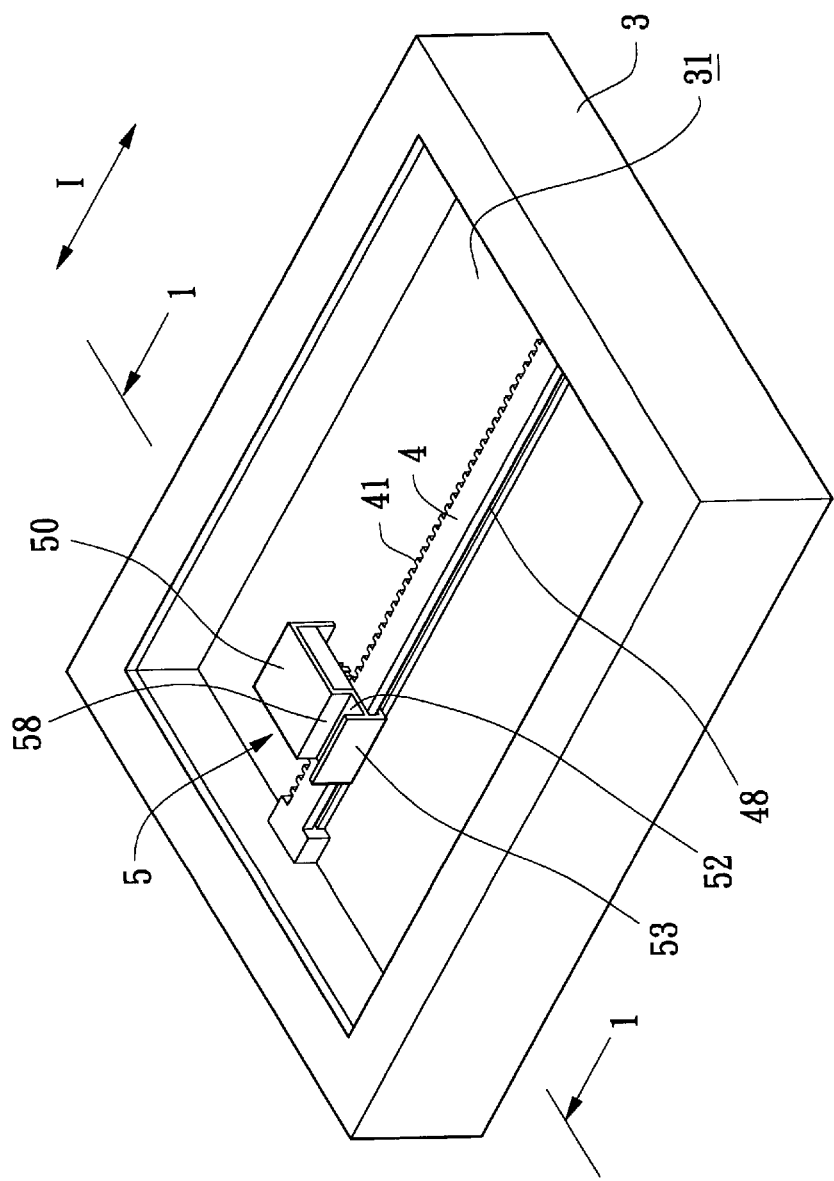
FIG. 2 is a perspective view of an optic scanner incorporating a carrier mechanism in accordance with a first embodiment of the present invention, an image scanning module being removed from the drawing for simplicity.
Figure 3:
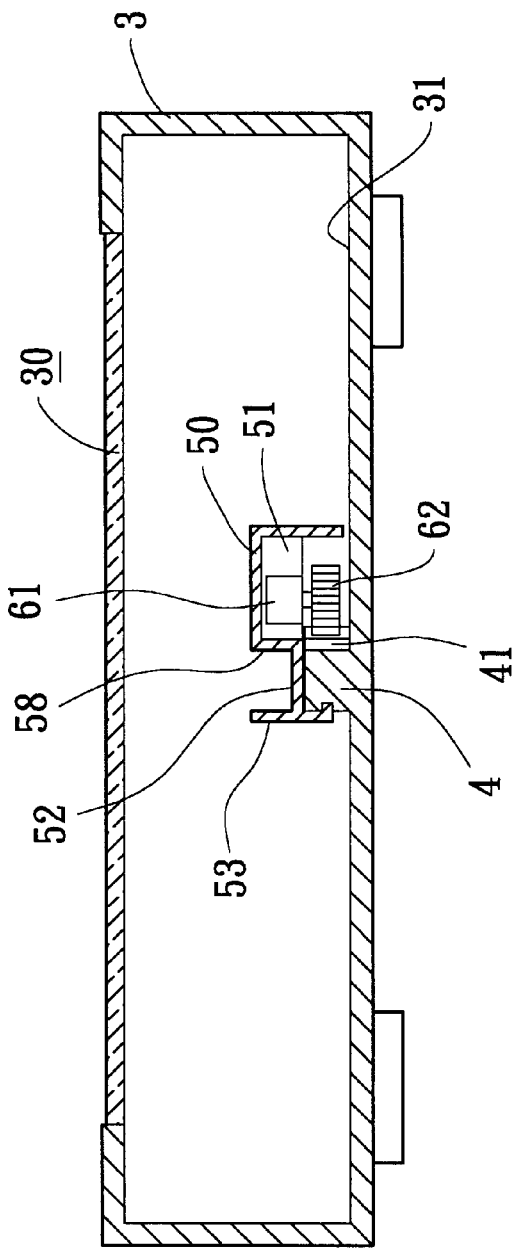
FIG. 3 is a cross-sectional view taken along line 1—1 of FIG. 2.
Figure 4:
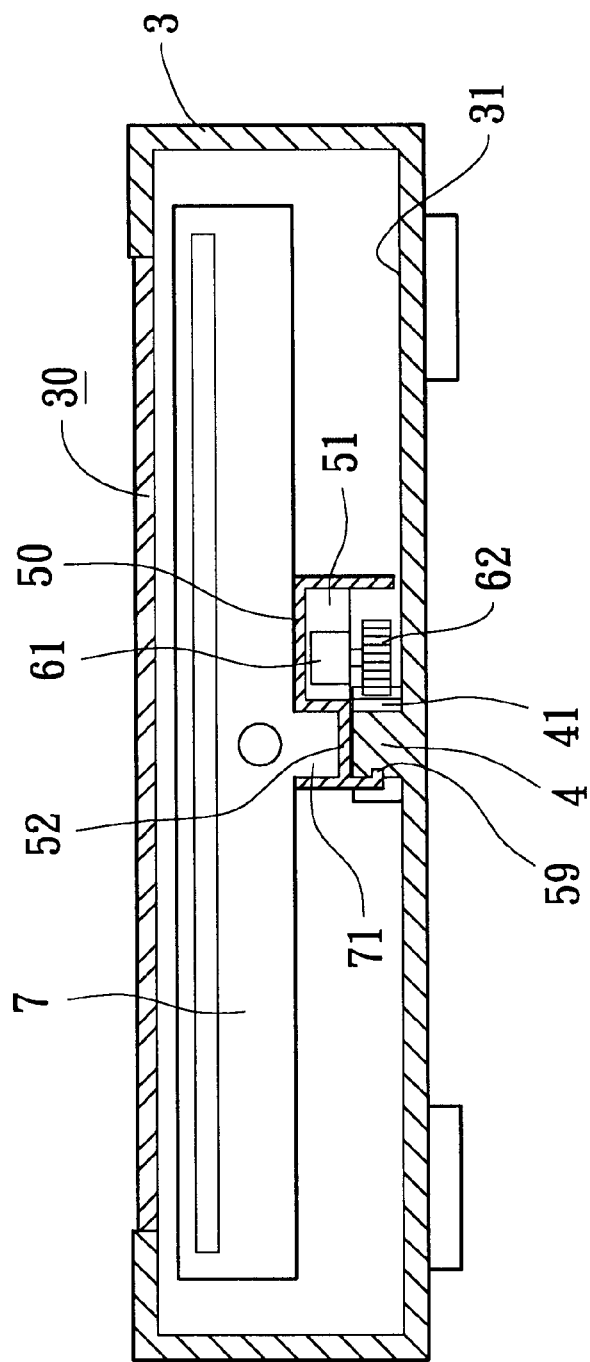
FIG. 4 is similar to FIG. 3 but the image scanning module is mounted on the carrier mechanism.

With reference to the drawings and in particular to FIGS. 2–4, an optic scanner comprises a casing 3 having a bottom 31 on which a carrier mechanism constructed in accordance with a first embodiment of the present invention is arranged. The casing 3 has an open top to which a document support plate 30 is fixed. A travelling module or an image scanning module 7 (FIG. 4) is removably mounted on the carrier mechanism to be moved thereby between a forward position and a rearward position in a forward-rearward direction indicated by arrow I. The document support plate 30 is generally light transmittable for supporting a document to be scanned by the image scanning module 7 when the image scanning module 7 is moved between the forward and rearward positions.

The carrier mechanism comprises guiding means which in the embodiment illustrated comprises an elongate raised strip 4 having a top face and two side faces connecting between the top face and the bottom 31 of the casing 3. Preferably, the strip 4 is integrally formed with the bottom 31 of the casing 3. A rack 41 is formed on and extending along a first side face of the strip 4. A groove 48 is defined in and extending along a second side face of the strip 4.

A carrier 5 comprises a base 52 movably supported on the top face of the strip 4. The carrier 5 comprises a scanning module retaining means which in the embodiment illustrated comprises two side walls 53, 58 extending from the base 52 defining a space therebetween for accommodating the scanning module 7. The carrier 5 further comprises carrier retaining means comprising a lower extension formed under the first side wall 53 with a sideways projection 59 transversely extending therefrom for being snugly and movably received in the groove 48 thereby retaining the carrier 5 in position on the strip 4.

The carrier 5 forms driving mechanism retaining means comprising a flat extension 50 projecting from the second side wall 58 and offset with respect to the base 52 for defining a space 51 under the flat extension 50 to accommodate and retain a driving mechanism.

The driving mechanism comprises a motor 61 received and fixed in the space 51 and a pinion 62 fixed to a spindle (not shown) of the motor 6. The pinion 62 engages the rack 41 whereby the carrier 5 is movable by the motor 6 along the strip 4 between the forward and rearward positions.

The scanning module 7 comprises a projection 71 removably received in the space defined by the base 52 and the side walls 53, 58 for attaching the scanning module 7 to the carrier 5. Bolts or other means may be employed to releasably secure the scanning module 7 to the carrier 5. Removably attaching the scanning module 7 to the carrier mechanism allows the scanning module 7 to be replaced easily. Furthermore, by providing scanning modules of different specifications with the same projection 71, different scanning modules may be mounted to the same carrier mechanism with modification of the carrier mechanism.

Figure 5:
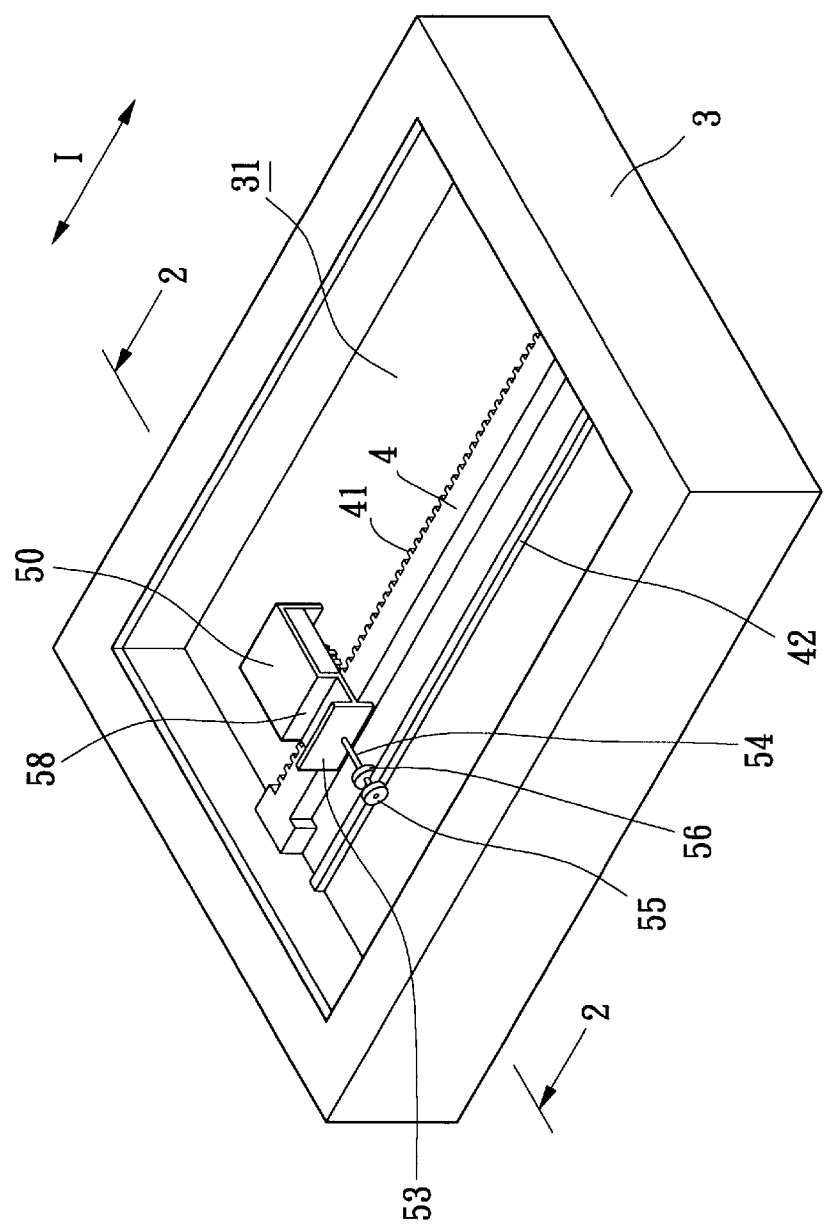
FIG. 5 is a perspective view of an optic scanner incorporating a carrier mechanism in accordance with a second embodiment of the present invention, an image scanning module being removed from the drawing for simplicity.
Figure 6:
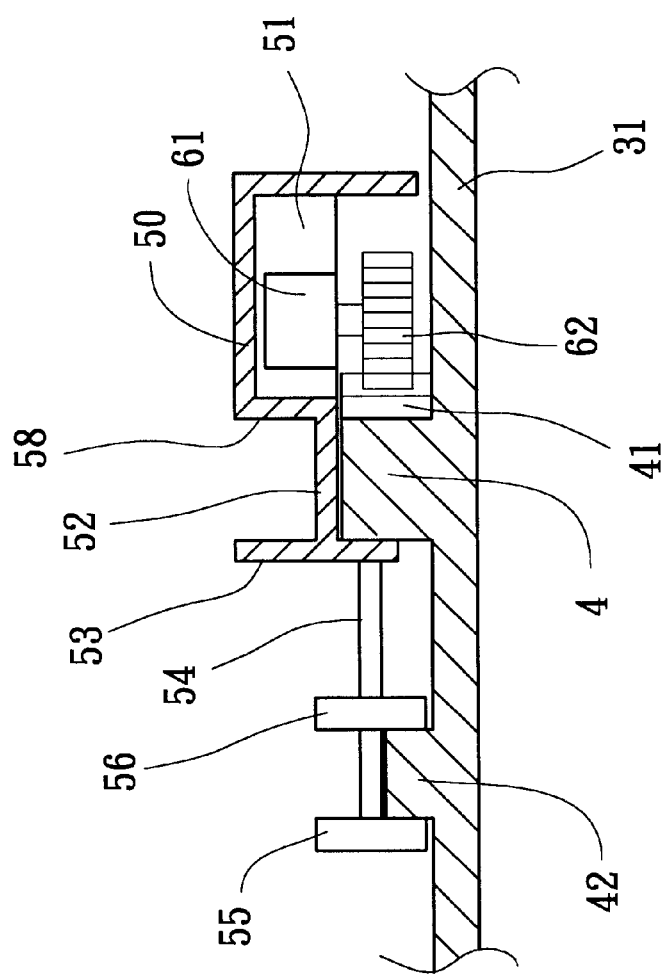
FIG. 6 is a cross-sectional view taken along line 2—2 of FIG. 5, the casing being partially removed.

FIGS. 5 and 6 show an optic scanner similar to that of the first embodiment shown in FIGS. 2–4 but incorporating a carrier mechanism in accordance with a second embodiment of the present invention. The carrier mechanism of the second embodiment is similar to that of the first embodiment and further comprises a guide rail 42 formed the bottom 31 of the casing 3. The guide rail 42 is spaced from and substantially parallel to the strip 41. A shaft 54 extends from the first side wall 53 with two rollers 55, 56 mounted thereto and movably supported on the bottom 31 of the casing 3. The rollers 55, 56 are free to rotate about or with the shaft 54 and are located on opposite sides of the guide rail 42 for more securely retaining the carrier 5 on the strip 4 and guiding the movement of the carrier 5 along the strip 4.

Figure 7:
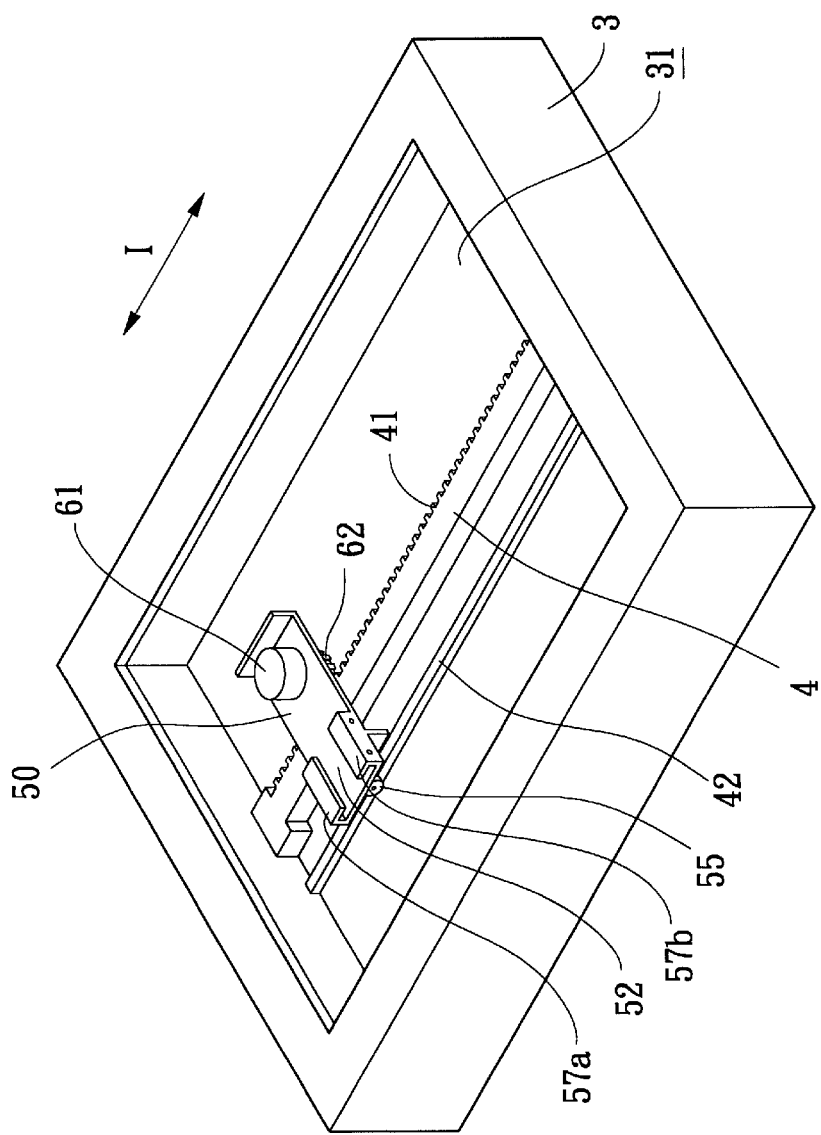
FIG. 7 is a perspective view of an optic scanner incorporating a carrier mechanism in accordance with a third embodiment of the present invention, an image scanning module being removed for simplicity.
Figure 8:
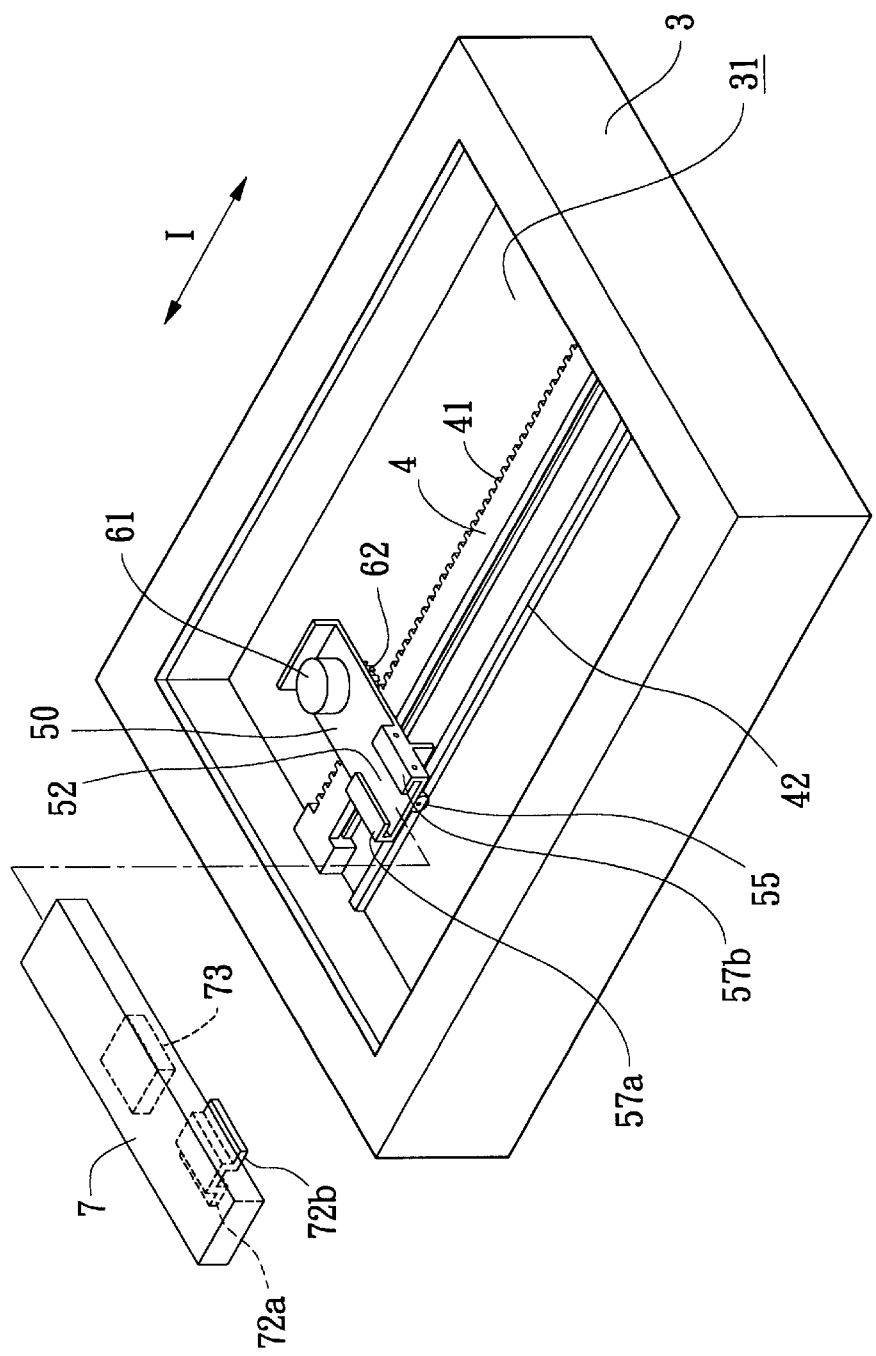
FIG. 8 is an exploded view of the optic scanner of FIG. 7, the image scanning module being shown detached from the carrier mechanism.

FIGS. 7 and 8 shows an optic scanner incorporating a carrier mechanism in accordance with a third embodiment of the present invention. The carrier mechanism of the third embodiment comprises a carrier 5 having a base 52 movably supported on the strip 41. The driving mechanism retaining means of the carrier 5 comprises a flat extension 50 projecting from and substantially co-planar with the base 52, forming a continuous surface. The extension 50 defines a bore (not labeled) for securely receiving and fixing the motor 61 of the driving mechanism whereby a portion of the of the motor 61 projects above the flat extension 50.

Instead of the space defined by the side walls 53, 58 in the first embodiment shown in FIGS. 2–4, the scanning module retaining means comprises two L-shaped projections 57a, 57b facing and spaced from each other. The scanning module comprises two tabs 72a, 72b offset from a bottom face of the scanning module 7 for being slidably receiving in and engaging with the L-shaped projections 57a, 57b thereby removably attaching the scanning module 7 to the carrier 5. Preferably, a recess 73 is defined in the bottom face of the scanning module 7 for accommodating the portion of the motor 61 that projects above the flat extension 50.

Similar to the second embodiment illustrated in FIGS. 5 and 6, a guide rail 42 is formed on the bottom 31 of the casing 3 of the scanner. A pair of rollers 55 is rotatably attached to the carrier 5 for cooperating with the rail 42 to guide the movement of the carrier 5.

Figure 9:
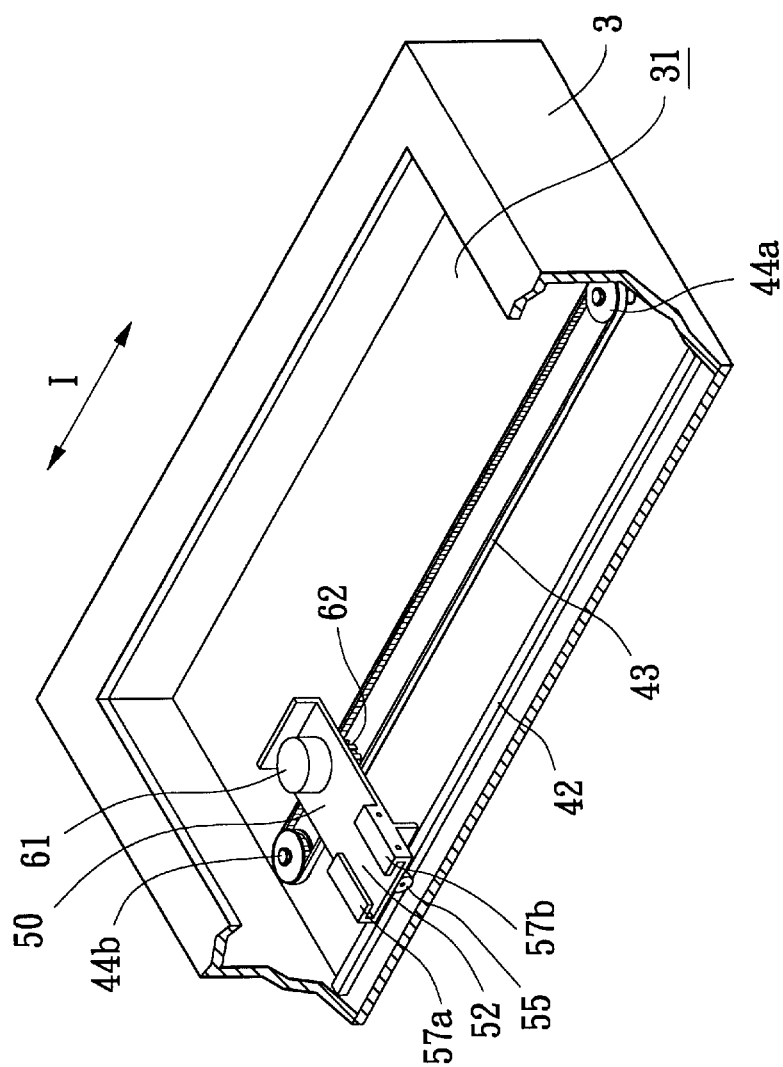
FIG. 9 is a perspective view, partially removed, of an optic scanner incorporating a carrier mechanism in accordance with a fourth embodiment of the present invention, an image scanning module being removed for simplicity.

FIG. 9 shows an optic scanner incorporating a carrier mechanism in accordance with a fourth embodiment of the present invention. The carrier mechanism of the fourth embodiment is similar that of the third embodiment illustrated in FIGS. 7 and 8 with the pinion-rack system of the guiding means replaced by a wheel-belt system comprising a pair of spaced toothed wheels 44a, 44b and an endless timing belt 43 surrounding the tooth wheels 44a, 44b. The carrier 5 is movably supported on the guide rail 42 and the belt 43 with the pinion 62 of the driving mechanism in driving engagement with the belt 43 whereby when the motor 61 is actuated, the carrier 5 is driven by the belt 43 to move between the forward and rearward positions.

Figure 10:
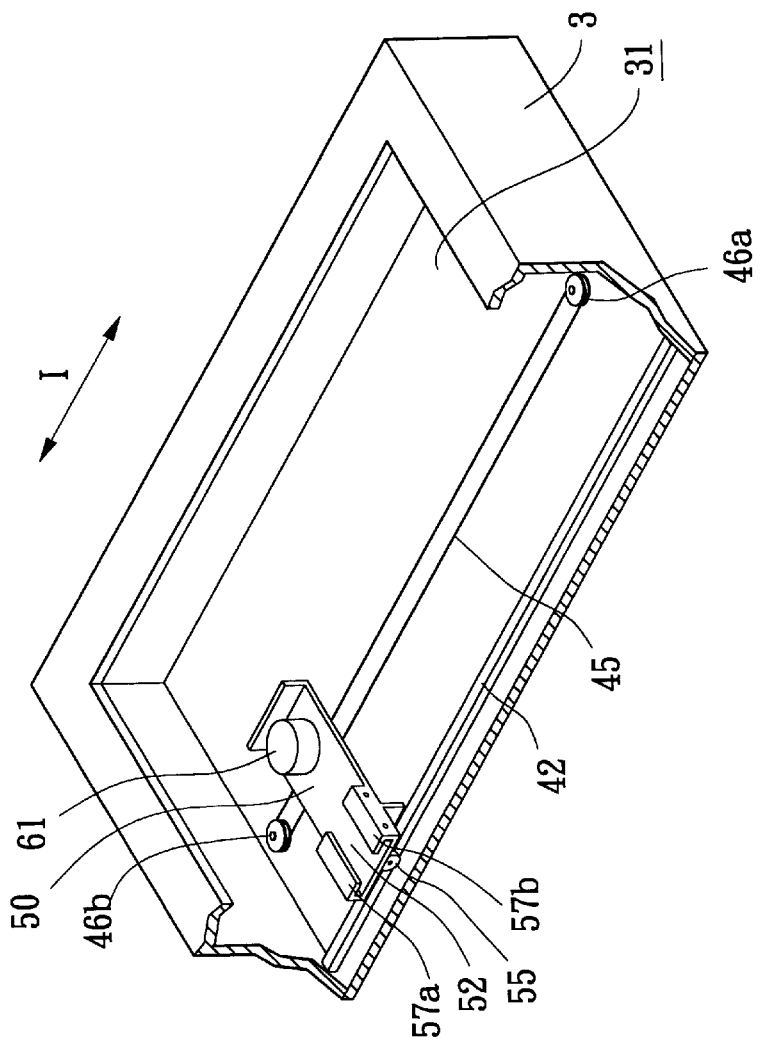
FIG. 10 is similar to FIG. 9 but showing an optic scanner incorporating a carrier mechanism in accordance with a fifth embodiment of the present invention.

FIG. 10 shows an optic scanner incorporating a carrier mechanism in accordance with a fifth embodiment of the present invention. The carrier mechanism of the fifth embodiment is similar to that of the fourth embodiment illustrated in FIG. 9 but the timing belt 43 of the fourth embodiment is replaced by an endless wire 45. Pulleys 46a, 46b surrounded by the wire 45 are rotatably supported on the bottom 31 of the casing 3. The pinion of the motor 61 is replaced by a pulley in driving engagement with the wire 45 for moving the carrier 5 between the forward and rearward positions.

Figure 11:
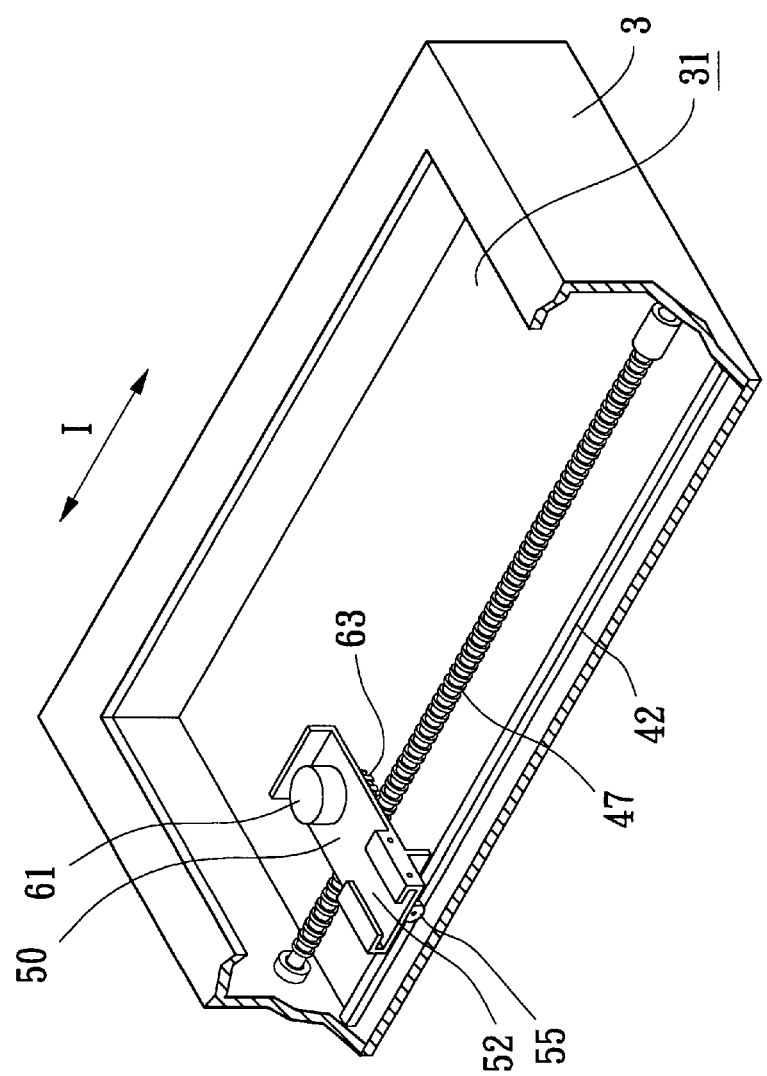
FIG. 11 is similar to FIG. 9 but showing an optic scanner incorporating a carrier mechanism in accordance with a sixth embodiment of the present invention.

FIG. 11 shows an optic scanner incorporating a carrier mechanism in accordance with a sixth embodiment of the present invention. The carrier mechanism of the sixth embodiment is similar to that of the third embodiment illustrated in FIGS. 7 and 8 with the rack of the third embodiment replaced by a worm gear 47. Accordingly, the pinion of the motor 61 of the third embodiment is replaced by a worm gear 63 as shown in FIG. 11.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A carrier mechanism adapted to be arranged inside a casing for removably supporting a traveling module thereon and for moving the traveling module in a predetermined direction between a first position and a second position, comprising:

guiding means being fixedly secured within the casing;
  a carrier supported on the guiding means and movable between the first and second positions, the carrier being adapted to removably support the traveling module thereon, the carrier having a pair of L-shaped projections spaced apart from one another, the L-shaped projections being adapted to slidably receive offset tabs formed on the traveling module for removably attaching the traveling module to the carrier; and a driving mechanism mounted to the carrier and in driving engagement with the guiding means for moving the carrier between the first and second positions.

2. The carrier mechanism as claimed in claim 1, wherein the guiding means comprises an elongate strip, the strip having a first side face on which a rack is formed, the driving mechanism comprising a pinion in driving engagement with the rack.

3. The carrier mechanism as claimed in claim 1, wherein the carrier comprises a base section movably supported on the strip.

4. The carrier mechanism as claimed in claim 1, wherein the driving mechanism comprises a motor and a pinion mounted to and driven by the motor, the pinion being in driving engagement with a corresponding toothed portion of the guiding means for moving the carrier between the first and second positions, the carrier defining a space for accommodating and retaining the motor.

5. The carrier mechanism as claimed in claim 1, wherein the guiding means comprises a pair of toothed wheels rotatably mounted in the casing and a timing belt surrounding the toothed wheels, the driving mechanism comprising a pinion in driving engagement with the belt.

6. The carrier mechanism as claimed in claim 1, wherein the guiding means comprises a pair of pulleys rotatably mounted in the casing and a wire surrounding the pulleys, the driving mechanism comprising a pulley in driving engagement with the wire.

7. A carrier mechanism adapted to be arranged inside a casing for removably supporting a traveling module thereon and for moving the traveling module in a predetermined direction between a first position and a second position, comprising:

guiding means being fixedly secured within the casing, the guiding means including an elongate strip, the elongate strip having a first side face on which a rack is formed, the driving mechanism comprising a pinion in driving engagement with the rack;

a carrier supported on the guiding means and movable between the first and second positions, the carrier being adapted to removably support the traveling module thereon, the carrier comprising a base section movably supported on the strip, the carrier having a sidewall extending from the base section, a sideways projection being formed on the sidewall and slidably received in a groove defined in a second side face of the strip; and a driving mechanism mounted to the carrier and in driving engagement with the guiding means for moving the carrier between the first and second positions.

8. The carrier mechanism adapted to be arranged inside a casing for removably supporting a traveling module thereon and for moving the traveling module in a predetermined direction between a first position and a second position as claimed in claim 7, wherein the carrier forms a sideways extension to which at least one roller is mounted for movably supporting the carrier on a bottom of the casing.

* * * * *